(12) United States Patent
Fattal (10) Patent No.: US 10,810,917 B2
(45) Date of Patent: Oct. 20, 2020

(54) 2D/3D MODE-SWITCHABLE ELECTRONIC DISPLAY WITH DUAL LAYER BACKLIGHT

(71) Applicant: LEIA INC., Menlo Park, CA (US)

(72) Inventor: David A. Fattal, Mountain View, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 15/866,372

(22) Filed: Jan. 9, 2018

(65) Prior Publication Data

US 2018/0156963 A1 Jun. 7, 2018

Related U.S. Application Data

(63) Continuation of application No. PCT/US2015/041855, filed on Jul. 23, 2015.
(Continued)

(51) Int. Cl.
*G09G 3/00* (2006.01)
*G02F 1/13357* (2006.01)
(Continued)

(52) U.S. Cl.
CPC ........... *G09G 3/003* (2013.01); *G02B 6/0036* (2013.01); *G02B 30/26* (2020.01);
(Continued)

(58) Field of Classification Search
CPC .... G02B 6/0036; G02B 27/225; G09G 3/003; G09G 3/36; G09G 3/342; G09G 3/3406;
(Continued)

(56) References Cited

U.S. PATENT DOCUMENTS 5,561,558 A 10/1996 Shiono et al.
6,324,330 B1 11/2001 Stites
(Continued)

FOREIGN PATENT DOCUMENTS

JP 2009295598 A 12/2009
JP 2013195608 A 9/2013
(Continued)

OTHER PUBLICATIONS

International Search Report (ISR) from the International Searching Authority (ISA/KR) dated Apr. 12, 2016 (3 pages) for counterpart parent PCT Application No. PCT/US2015/041855.
(Continued)

*Primary Examiner* — Premal R Patel
(74) *Attorney, Agent, or Firm* — J. Michael Johnson (57) ABSTRACT

A dual layer backlight employs a first planar backlight to emit light and a second planar backlight to provide a plurality of coupled-out light beams. The second planar backlight includes a plate light guide and a multibeam diffraction grating configured to diffractively couple out a portion of a guided light beam within the plate light guide as the plurality of coupled-out light beams. A light beam of the coupled-out light beam has a different principal angular direction from other light beams of the coupled-out light beam plurality. A two-dimensional/three-dimensional (2D/3D) mode-switchable electronic display includes the dual layer backlight and a light valve array configured to selectively modulate emitted light as 2D pixels in a first mode and the coupled-out light beams as 3D pixels corresponding to the different 3D views in a second mode of the electronic display.

25 Claims, 5 Drawing Sheets

Related U.S. Application Data (60) Provisional application No. 62/140,306, filed on Mar. 30, 2015.

(51) Int. Cl.
*G02B 30/26* (2020.01)
*F21V 8/00* (2006.01)
*G09G 3/36* (2006.01)
*G09G 3/34* (2006.01)

(52) U.S. Cl.
CPC .. *G02F 1/133606* (2013.01); *G02F 1/133611* (2013.01); *G02F 1/133615* (2013.01); *G02F 1/133602* (2013.01); *G02F 2001/133626* (2013.01); *G09G 3/342* (2013.01); *G09G 3/3406* (2013.01); *G09G 3/3413* (2013.01); *G09G 3/36* (2013.01)

(58) Field of Classification Search
CPC ............. G09G 3/3413; G02F 1/133611; G02F 1/133606; G02F 1/133615; G02F 2001/133626; G02F 1/133602
See application file for complete search history.

(56) References Cited

U.S. PATENT DOCUMENTS

| | | | |
|---|---|---|---|
| 7,413,334 B2 | 8/2008 | Baba | |
| 8,035,762 B2 | 10/2011 | Ijzerman et al. | |
| 8,681,423 B1* | 3/2014 | Gibson | G02B 6/0035 349/196 |
| 9,036,099 B2 | 5/2015 | Hirakata | |
| 9,128,226 B2 | 9/2015 | Fattal et al. | |
| 9,201,270 B2 | 12/2015 | Fattal et al. | |
| 9,257,063 B2 | 2/2016 | Takahashi | |
| 9,298,168 B2 | 3/2016 | Taff et al. | |
| 9,389,415 B2 | 7/2016 | Fattal et al. | |
| 9,459,461 B2 | 10/2016 | Santori et al. | |
| 9,557,466 B2 | 1/2017 | Fattal | |
| 9,785,119 B2 | 10/2017 | Taff et al. | |
| 2005/0123229 A1 | 6/2005 | Huck et al. | |
| 2006/0279296 A1* | 12/2006 | Lee | G02B 6/0038 324/691 |
| 2008/0192173 A1 | 8/2008 | Itoh et al. | |
| 2009/0296193 A1* | 12/2009 | Bita | G02B 6/0038 359/291 |
| 2010/0110558 A1* | 5/2010 | Lee | G02B 27/1006 359/639 |
| 2010/0141868 A1* | 6/2010 | St. Hilaire | G02B 6/0036 349/62 |
| 2010/0177025 A1 | 7/2010 | Nagata et al. | |
| 2011/0002143 A1 | 1/2011 | Saarikko et al. | |
| 2011/0013417 A1 | 1/2011 | Saccomanno et al. | |
| 2011/0141395 A1* | 6/2011 | Yashiro | G02B 6/0036 349/62 |
| 2011/0188106 A1 | 8/2011 | Bae et al. | |
| 2011/0216266 A1 | 9/2011 | Travis | |
| 2011/0242441 A1 | 10/2011 | Minami | |
| 2011/0242837 A1* | 10/2011 | Cornelissen | G02B 6/002 362/555 |
| 2011/0273636 A1* | 11/2011 | Schultz | G02B 30/27 349/15 |
| 2012/0008067 A1* | 1/2012 | Mun | G02B 6/003 349/65 |
| 2012/0147059 A1 | 6/2012 | Chen et al. | |
| 2012/0281950 A1* | 11/2012 | Fattal | G02B 6/02061 385/37 |
| 2013/0201723 A1* | 8/2013 | Gourlay | G02B 6/0036 362/613 |
| 2013/0308339 A1 | 11/2013 | Woodgate et al. | |
| 2013/0343038 A1 | 12/2013 | Niu et al. | |
| 2014/0146271 A1* | 5/2014 | Hung | G02B 6/0011 349/62 |
| 2014/0160720 A1* | 6/2014 | Seuntiens | E04B 9/32 362/2 |
| 2015/0003106 A1* | 1/2015 | Thompson | G02B 6/0035 362/607 |
| 2015/0016777 A1* | 1/2015 | Abovitz | G02B 27/225 385/37 |
| 2015/0022746 A1 | 1/2015 | Ichihashi et al. | |
| 2015/0036068 A1 | 2/2015 | Fattal et al. | |
| 2015/0301264 A1* | 10/2015 | Min | G02B 5/0231 362/343 |
| 2016/0018582 A1 | 1/2016 | Fiorentino et al. | |
| 2017/0329149 A1 | 11/2017 | Fattal | |
| 2017/0363794 A1 | 12/2017 | Wan et al. | |
| 2018/0024289 A1 | 1/2018 | Fattal | |

FOREIGN PATENT DOCUMENTS

| | | |
|---|---|---|
| WO | 2014142851 A1 | 9/2014 |
| WO | 2015028992 A1 | 3/2015 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

* cited by examiner

2D/3D MODE-SWITCHABLE ELECTRONIC DISPLAY WITH DUAL LAYER BACKLIGHT

CROSS-REFERENCE TO RELATED APPLICATIONS

This application is a continuation patent application of and claims the benefit of priority to International Application No. PCT/US2015/041855, filed Jul. 23, 2015, which claims priority from U.S. Provisional Patent Application Ser. No. 62/140,306, filed Mar. 30, 2015, the entirety of which are incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Among the most commonly found electronic displays are the cathode ray tube (CRT), plasma display panels (PDP), liquid crystal displays (LCD), electroluminescent displays (EL), organic light-emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). In general, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. Backlights are light sources (often panel light sources) that are placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments may have other features that are one of in addition to and in lieu of the features illustrated in the above-referenced figures. These and other features are detailed below with reference to the above-referenced figures.

DETAILED DESCRIPTION

Embodiments and examples in accordance with the principles described herein provide for information display that supports switching between the display of two-dimensional (2D) information and three-dimensional (3D) information. In particular, in accordance with the principles described herein, information may be selectively displayed in either a 2D mode or a 3D mode. The 3D mode may be employed to present images and similar information in conjunction with a so-called 'glasses-free' or autostereoscopic display system, while the 2D mode may be used to present information that either lacks or at least does not benefit from a third dimension (e.g., information such as text, 2D images, etc.). Moreover, the switchable 2D and 3D modes are provided on the same display unit or system, according to various examples of the principles described herein. A switchable display system that is capable of selectively displaying both 2D information and 3D information on the same display system may facilitate adapting a single display system to a much wider range of differing data presentation requirements than is possible using either a 2D display alone or a 3D display alone.

According to various embodiments, a dual layer backlight is employed to facilitate switching between displaying 2D information and 3D information. In particular, a first layer of the dual layer backlight provides emitted light configured to provide or display 2D information. A second layer of the dual layer backlight is configured to support the display of 3D information by emitting a plurality of light beams having predetermined principal angular directions corresponding to various 3D views. According to various embodiments, the first layer of the dual layer backlight may include substantially any planar backlight. The second layer of the dual layer backlight includes a light guide and a multibeam diffraction grating to produce coupled-out light beams of the light beam plurality, according to various embodiments.

Herein, a 'light guide' is defined as a structure that guides light within the structure using total internal reflection. In particular, the light guide may include a core that is substantially transparent at an operational wavelength of the light guide. In various embodiments, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces both are separated from one another and may be substantially parallel to one another in at least a differential sense, according to some embodiments. That is, within any differentially small section of the plate light guide, the top and bottom surfaces are substantially parallel or co-planar.

In other embodiments, the plate light guide may have a wedge shape in which a space between the top and bottom surfaces changes as a function of distance across the plate light guide. In particular, in some embodiments, the wedge shape may comprise a top surface to bottom surface spacing that increases with distance from an input end (e.g., adjacent to a light source) to an output or terminal end of the wedge-shaped plate light guide. Such a wedge-shaped light guide may provide collimation (e.g., vertical collimation) of light introduced at the input end, for example.

In some embodiments, a plate light guide may be substantially flat (i.e., confined to a plane) and so the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the plate light guide to guide light.

According to various embodiments described herein, a diffraction grating (e.g., a multibeam diffraction grating) may be employed to scatter or couple light out of a light guide (e.g., a plate light guide) as a light beam. Herein, a 'diffraction grating' is generally defined as a plurality of features (i.e., diffractive features) arranged to provide diffraction of light incident on the diffraction grating. In some embodiments, the plurality of features may be arranged in a periodic or quasi-periodic manner. For example, the diffraction grating may include a plurality of features (e.g., a plurality of grooves in a material surface) arranged in a one-dimensional (1-D) array. In other examples, the diffraction grating may be a two-dimensional (2-D) array of features. The diffraction grating may be a 2-D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating (i.e., diffracted light) generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a surface (i.e., wherein a 'surface' refers to a boundary between two materials). The surface may be a surface of a plate light guide. The diffractive features may include any of a variety of structures that diffract light including, but not limited to, one or more of grooves, ridges, holes and bumps, and these structures may be one or more of at, in and on the surface. For example, the diffraction grating may include a plurality of parallel grooves in a material surface. In another example, the diffraction grating may include a plurality of parallel ridges rising out of the material surface. The diffractive features (whether grooves, ridges, holes, bumps, etc.) may have any of a variety of cross sectional shapes or profiles that provide diffraction including, but not limited to, one or more of a sinusoidal profile, a rectangular profile (e.g., a binary diffraction grating), a triangular profile and a saw tooth profile (e.g., a blazed grating).

By definition herein, a 'multibeam diffraction grating' is a diffraction grating that produces coupled-out light that includes a plurality of light beams. Further, the light beams of the plurality produced by a multibeam diffraction grating have different principal angular directions from one another, by definition herein. In particular, by definition, a light beam of the plurality has a predetermined principal angular direction that is different from another light beam of the light beam plurality as a result of diffractive coupling and diffractive redirection of incident light by the multibeam diffraction grating. The light beam plurality may represent a light field. For example, the light beam plurality may include eight light beams that have eight different principal angular directions. The eight light beams in combination (i.e., the light beam plurality) may represent the light field, for example. According to various embodiments, the different principal angular directions of the various light beams are determined by a combination of a grating pitch or spacing and an orientation or rotation of the diffractive features of the multibeam diffraction grating at points of origin of the respective light beams relative to a propagation direction of the light incident on the multibeam diffraction grating.

According to various embodiments described herein, the light coupled out of the light guide by the diffraction grating (e.g., a multibeam diffraction grating) represents a pixel of an electronic display. In particular, the light guide having a multibeam diffraction grating to produce the light beams of the plurality having different principal angular directions may be part of a backlight of or used in conjunction with an electronic display such as, but not limited to, a 'glasses free' three-dimensional (3D) electronic display (also referred to as a multiview or 'holographic' electronic display or an autostereoscopic display). As such, the differently directed light beams produced by coupling out guided light from the light guide using the multibeam diffractive grating may be or represent 'pixels' of the 3D electronic display. Moreover, as described above, the differently directed light beams may form a light field.

Herein a 'collimating' mirror is defined as a mirror having a curved shape that is configured to collimate light reflected by the collimating mirror. For example, the collimating mirror may have a reflecting surface characterized by a parabolic curve or shape. In another example, the collimating mirror may comprise a shaped parabolic mirror. By 'shaped parabolic' it is meant that a curved reflecting surface of the shaped parabolic mirror deviates from a 'true' parabolic curve in a manner determined to achieve a predetermined reflection characteristics (e.g., degree of collimation). In some embodiments, the collimating mirror may be a continuous mirror (i.e., having a substantially smooth, continuous reflecting surface), while in other embodiments the mirror may comprise a Fresnel reflector or Fresnel mirror that provides light collimation. According to various embodiments, an amount of collimation provided by the collimating mirror may vary in a predetermined degree from one embodiment to another. Further, the collimating mirror may be configured to provide collimation in one or both of two orthogonal directions (e.g., a vertical direction and a horizontal direction). That is, the collimating mirror may include a parabolic or shaped parabolic shape in one or both of two orthogonal directions, according to various examples.

Herein, a 'light source' is defined as a source of light (e.g., an apparatus or device that produces and emits light). For example, the light source may be a light emitting diode (LED) that emits light when activated. Herein, a light source may be substantially any source of light or optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light).

Further, as used herein, the article 'a' is intended to have its ordinary meaning in the patent arts, namely 'one or more'. For example, 'a grating' means one or more gratings and as such, 'the grating' means 'the grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 1A:
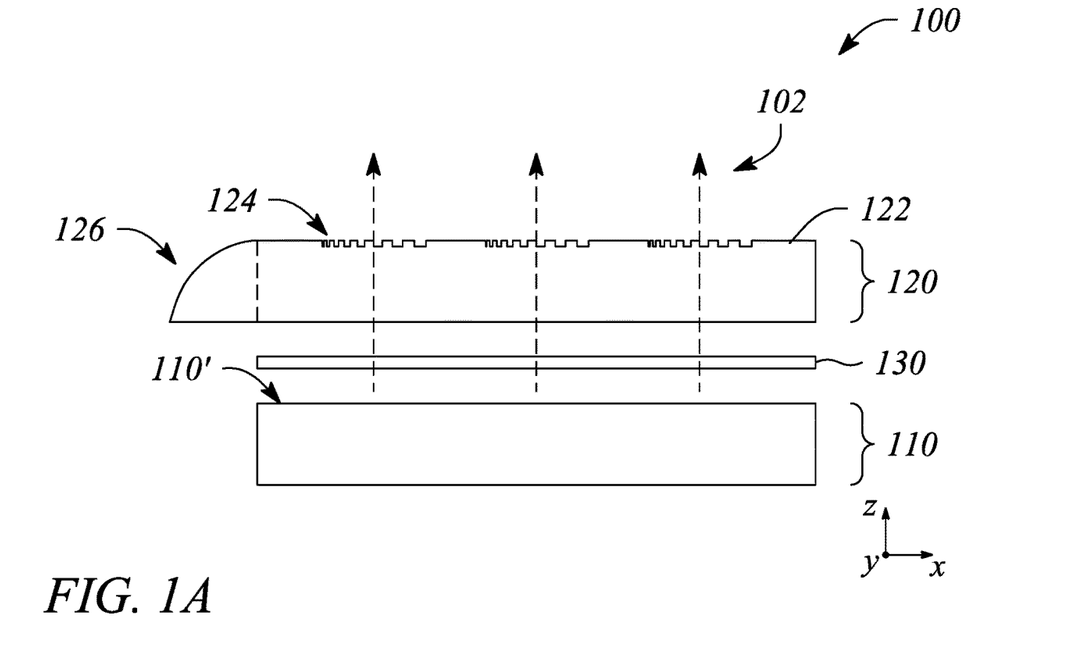
FIG. 1A illustrates a cross sectional view of a dual layer backlight in an example, according to an embodiment consistent with the principles described herein.
Figure 1B:
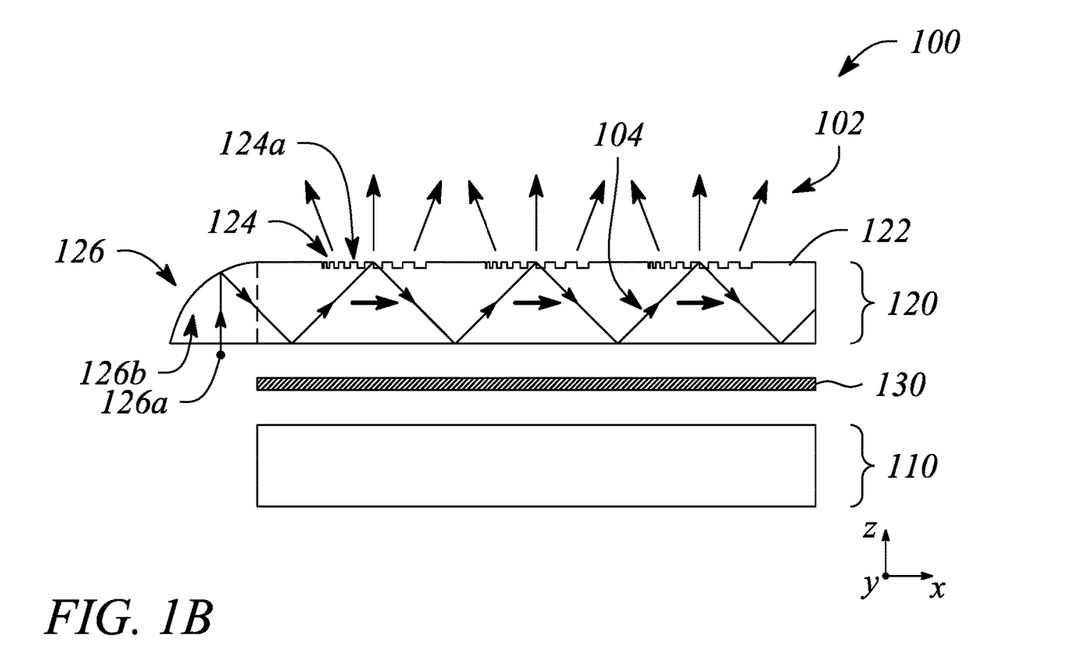
FIG. 1B illustrates a cross sectional view of a dual layer backlight in another example, according to an embodiment consistent with the principles described herein.

In accordance with some embodiments of the principles described herein, a dual layer backlight is provided. FIG. 1A illustrates a cross sectional view of a dual layer backlight 100 in an example, according to an embodiment consistent with the principles described herein. FIG. 1B illustrates a cross sectional view of a dual layer backlight 100 in another example, according to an embodiment consistent with the principles described herein. According to various embodiments, the dual layer backlight 100 is configured to provide or emit light 102. In particular, the dual layer backlight 100 is configured to emit light 102 in a direction that is generally away from the dual layer backlight 100 (e.g., away from a surface thereof), as illustrated by various arrows labeled '102' in FIGS. 1A and 1B. The emitted light 102 may be used to illuminate an electronic display that employs the dual layer backlight 100, according to various examples and embodiments. Further, in some examples and embodiments, the electronic display employing the dual layer backlight 100 may be configured to selectively display one or both of two-dimensional (2D) and three-dimensional (3D) data or information using the emitted light 102, e.g., as a 2D/3D mode-switchable electronic display.

In particular, the light 102 emitted by the dual layer backlight 100 may comprise light that is one or both of directional and diffuse (or i.e., one or both of substantially directional and substantially diffuse). Emitted light 102 that is 'directional' or substantially directional may comprise a plurality of light beams 102. In contrast, emitted light 102 that is 'diffuse' substantially lacks a plurality of light beams 102, and instead is characterized as randomly scattered light, by definition herein. In some examples, directional light 102 emitted by the dual layer backlight 100 may comprise a plurality of light beams 102 having predetermined principal angular directions that differ from one another. In other examples, the 'directional' emitted light 102 from the dual layer backlight 100 may comprise a plurality of light beams 102 having a substantially similar principal angular direction (i.e., substantially unidirectional light beams 102). FIG. 1A illustrates an example of either diffuse or unidirectional emitted light 102 and FIG. 1B illustrates an example of emitted light 102 having different predetermined principal angular directions. Note that in FIG. 1A, the emitted light 102 is illustrated using dashed arrows to distinguish emitted light 102 that is either substantially unidirectional or diffuse from emitted light comprising the plurality of light beams 102, e.g., illustrated as solid arrows in FIG. 1B. As such, the emitted light 102 illustrated in FIG. 1A by dashed arrows represents light that is generally directed in a direction of the dashed arrows as opposed to being light beams per se that are so-directed.

Moreover, according to some embodiments, the plurality of light beams 102 having different predetermined angular directions may form a light field in a viewing direction of an electronic display that employs the dual layer backlight 100. In particular, a light beam 102 of the plurality of light beams 102 (and within the light field) provided or emitted by the dual layer backlight 100 may be configured to have a different principal angular direction from other light beams 102 of the plurality. Further, the light beam 102 may have both a predetermined direction (principal angular direction) and a relatively narrow angular spread within the light field. With respect to use in a 3D electronic display, the principal angular direction of the light beam 102 may correspond to an angular direction of a particular view of the 3D electronic display. As such, the light beam 102 may represent or correspond to a pixel of the 3D electronic display associated with a particular view, according to some examples.

In contrast, in some embodiments in which the emitted light 102 is either diffuse (i.e., substantially lacks a plurality of light beams 102) or includes a plurality of light beams 102 having a substantially similar principal angular direction (i.e., co-directed or unidirectional emitted light beams 102), the emitted light 102 generally does not form a light field. Instead, the emitted light 102 provided by the dual layer backlight 100 that is diffuse may provide substantially omnidirectional illumination within a relatively broad cone angle directed away from (e.g., above) the dual layer backlight 100 or surface thereof. Similarly, the emitted light 102 provided by the dual layer backlight 100 that comprises similarly directed light beams 102 may represent substantially unidirectional emitted light 102 that is emitted substantially perpendicular to the dual layer backlight 100 or a surface thereof. The emitted light 102 that is either diffuse or comprises similarly directed light beams 102 may be used as a backlight for a two-dimensional (2D) electronic display, according to various embodiments.

In some embodiments, the emitted light 102 produced by the dual layer backlight 100 may be modulated (e.g., by a light valve as described below). In particular, the modulation of the light beams 102 directed in different angular directions away from the dual layer backlight 100 may be particularly useful for dynamic 3D color electronic display applications. That is, the individually modulated light beams 102 directed in a particular view direction may represent dynamic pixels of the 3D electronic display corresponding to the particular view direction. On the other hand, the modulated emitted light 102 that is either substantially unidirectional or diffuse may represent dynamic 2D pixels in 2D electronic display applications, for example.

As illustrated in FIGS. 1A-1B, the dual layer backlight 100 comprises a first planar backlight 110. The first planar backlight 110 has a planar light-emitting surface 110' configured to provide emitted light 102 (e.g., FIG. 1A). According to various embodiments, the first planar backlight 110 may be substantially any backlight having a substantially planar light-emitting surface 110'. For example, the first planar backlight 110 may be a direct-emitting or directly illuminated planar backlight. Direct-emitting or directly illuminated planar backlights include, but are not limited to, a backlight panel employing a planar array of cold-cathode fluorescent lamps (CCFLs), neon lamps or light emitting diodes (LEDs) configured to directly illuminate the planar light-emitting surface 110' and provide the emitted light 102. An electroluminescent panel (ELP) is another non-limiting example of a direct-emitting planar backlight.

In other examples, the first planar backlight 110 may comprise a backlight that employs an indirect light source. Such indirectly illuminated backlights may include, but are not limited to, various forms of edge-coupled or so-called 'edge-lit' backlights. An edge-lit backlight typically includes a light source (not illustrated in FIGS. 1A-1B) coupled to an edge or side of a light guide or similar guiding structure (e.g., a hollow guiding cavity). The edge-coupled light source is configured to illuminate the guiding structure to provide light within the edge-lit backlight. The edge-coupled light source may include, but is not limited to, a CCFL and an LED, for example. The guiding structure may be configured to guide light from the edge-coupled light source using total internal reflection (TIR), a mirrored surface (e.g., a mirrored back surface), or a combination thereof, according to various examples. Further, in some examples, the guiding structure of the edge-lit backlight employed in the first planar backlight 110 may have a substantially rectangular cross section with parallel opposing surfaces (e.g., top and bottom surfaces). In other examples, the guiding structure may have a tapered or wedge-shaped cross section (i.e., the guiding structure may be 'wedge-shaped') with a first surface that is substantially non-parallel with a second, opposing surface.

According to various embodiments, the edge-lit backlight employed as the first planar backlight 110 further includes an extraction feature (not illustrated in FIGS. 1A-1B). The extraction feature is configured to extract light from the guiding structure and redirect the extracted light in a direction away from the guiding structure. For example, the extraction feature may extract light as the emitted light 102 and direct the emitted light 102 away from the planar light-emitting surface 110' of the edge-lit backlight. Extraction features may include, but are not limited to, various micro-prismatic films or layers adjacent to a surface (e.g., a top surface) of the guiding structure as well as various scatters or reflectors located either within the guiding structure itself or adjacent to one or both of a pair of opposing surfaces thereof.

Figure 2:
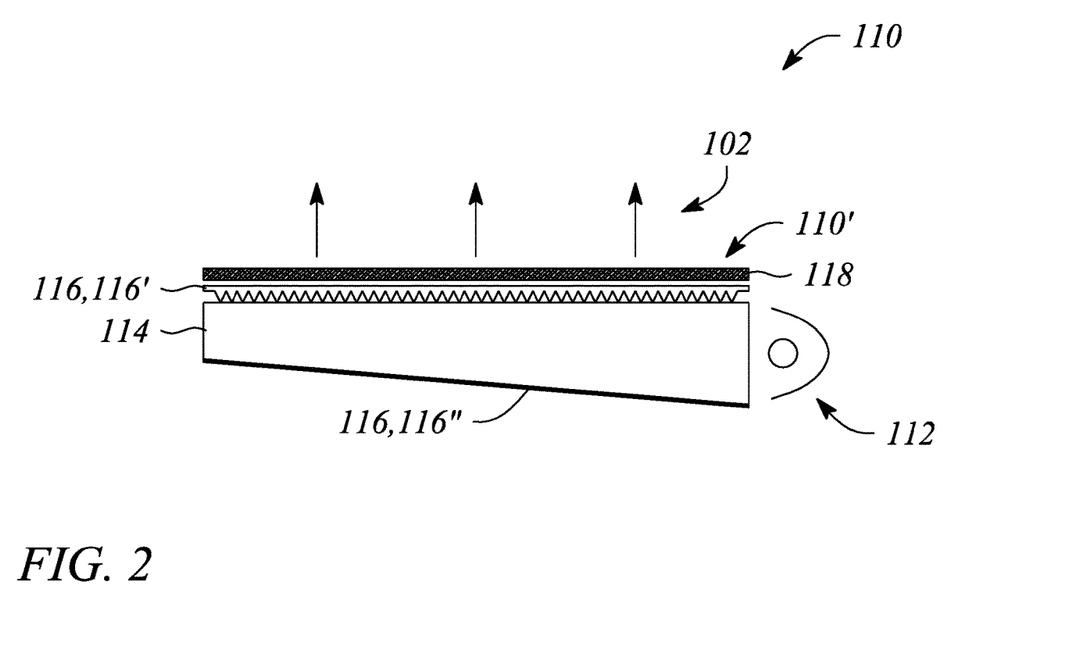
FIG. 2 illustrates a cross sectional view of a first planar backlight in an example, according to an embodiment consistent with the principles described herein.

FIG. 2 illustrates a cross sectional view of a first planar backlight 110 in an example, according to an embodiment consistent with the principles described herein. As illustrated in FIG. 2, the first planar backlight 110 comprises a light source 112 coupled to an edge of the first planar backlight 110. The edge-coupled light source 112 is configured to produce light within the first planar backlight 110. Further, as illustrated by way of example and not limitation, the first planar backlight 110 comprises a wedge-shaped guiding structure 114 having extraction features 116. The illustrated extraction features 116 include a micro-prism layer 116' adjacent to the planar light-emitting surface 110' (i.e., top surface) and a reflective layer 116" on a surface of the guiding structure 114 opposite to the planar light-emitting surface 110' (i.e., back surface). The light from the edge-coupled light source 112 guided within the guiding structure 114 is redirected, scattered out of or otherwise extracted from the guiding structure 114 by the extraction features 116 to provide the emitted light 102, according to various embodiments.

In some embodiments, the first planar backlight 110, whether direct-emitting or edge-lit (e.g., as illustrated in FIG. 2), may further have one or more additional layers or films including, but not limited to, a brightness enhancement film (BEF), a diffuser or diffusion layer, and a turning film or layer. For example, a diffuser may be configured to provide the emitted light 102 as diffuse light. FIG. 2 illustrates the first planar backlight 110 further comprising a diffuser 118 adjacent to the planar light-emitting surface 110' and configured to provide diffuse emitted light 102. According to various embodiments (not illustrated in FIG. 2), other layers or films of the first planar backlight 110 (e.g., BEF, turning layer, etc.) may also be adjacent to the planar light-emitting surface 110'.

Referring again to FIGS. 1A and 1B, the dual layer backlight 100 further comprises a second planar backlight 120. According to various embodiments, the second planar backlight 120 comprises a plate light guide 122 and a multibeam diffraction grating 124. A plurality (e.g., array) of multibeam diffraction gratings 124 is illustrated in FIGS. 1A-1B by way of example. The multibeam diffraction grating 124 of the second planar backlight 120 is configured to diffractively couple out a portion of a guided light beam 104 within the plate light guide 122 (e.g., by or using a diffractive coupling, also referred to as 'diffractive scattering'). In particular, the guided light beam portion is diffractively coupled out as a plurality of coupled-out light beams 102 directed away from a first surface of the second planar backlight 120 (see FIG. 1B). The first surface is opposite to a second surface of the second planar backlight 120. For example, the portion of the guided light beam 104 may be diffractively coupled out by the multibeam diffraction grating 124 through the light guide surface (i.e., through the top or front surface of the plate light guide 122, as illustrated). Further, as illustrated in FIGS. 1A-1B, the second surface of the second planar backlight 120 is adjacent to the planar light-emitting surface of the first planar backlight 110, according to various embodiments.

Note that the plurality of coupled-out light beams 102, as illustrated in FIG. 1B, is or represents the plurality of light beams 102 having different principal angular directions, described above. That is, a coupled-out light beam 102 has a different principal angular direction from other light beams 102 of the coupled-out light beam plurality, according to various embodiments. Further, the second planar backlight 120 may be substantially transparent (e.g., in at least an operation mode or condition) to the emitted light 102 from the first planar backlight 110, as illustrated in FIG. 1A by arrows labeled '102' that originate at the first planar backlight 110 and subsequently pass through the second planar backlight 120.

According to various embodiments, the dual layer backlight 100 has switchable modes. In a first mode of the dual layer backlight 100, the first planar backlight 110 may be configured to provide emitted light 102 that is transmitted through the second planar backlight 120. In a second mode of the dual layer backlight 100, the second planar backlight 120 may be configured to provide the plurality of coupled-out light beams 102. FIG. 1A represents the first mode of the dual layer backlight 100 with the emitted light 102 provided by the first planar backlight 110 that passes through the second planar backlight 120, while FIG. 1B represents the second mode of the dual layer backlight 100 in which the emitted light 102 (e.g., as light beams 102) is provided by the second backlight 120, for example. In some embodiments, the first and second modes may be mutually exclusive in or with respect to time. That is, the dual layer backlight 100 may be operated in either the first mode or the second mode at any particular point in time. In other embodiments, a portion of the dual layer backlight 100 may be operated in the first mode while another portion of the dual layer backlight 100 may be operated in the second mode, for example.

According to various embodiments, the plate light guide 122 of the second planar backlight 120 is configured to guide light (e.g., from a light source described below) as a guided light beam 104. In particular, the guided light beam 104 is guided in a first direction (e.g., to the right as illustrated in FIG. 1B). Further, the plate light guide 122 is configured to guide the guided light beam 104 at a non-zero propagation angle, according to various embodiments. For example, the plate light guide 122 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light beam 104 according to one or more guided modes of the light guide 122, for example.

As defined herein, a 'non-zero propagation angle' is an angle relative to a surface (e.g., a first/top surface or a second/bottom surface) of the plate light guide 122. In some examples, the non-zero propagation angle of the guided light beam 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees.

In some examples, light to be guided as the guided light beam 104 is introduced or coupled into the plate light guide 122 at the non-zero propagation angle (e.g., about 30-35 degrees). For example, one or more of a lens (not illustrated), a mirror or similar reflector (e.g., a tilted collimating reflector), and a prism (not illustrated) may facilitate coupling light into an input end the plate light guide 122 at the non-zero propagation angle. Once coupled into the plate light guide 122, the guided light beam 104 propagates along the plate light guide 122 in the first direction that is generally away from the input end (e.g., illustrated by bold arrows pointing along an x-axis in FIG. 1B). Further, the guided light beam 104 propagates by reflecting or 'bouncing' between the top surface and the bottom surface of the plate light guide 122 at the non-zero propagation angle (e.g., illustrated by an extended, angled arrow representing a light ray of the guided light beam 104).

The guided light beam 104 produced by coupling light into the plate light guide 122 may be collimated (e.g., may be a collimated light beam), according to some embodiments. Further, according to some embodiments, the guided light beam 104 may be collimated in a plane that is perpendicular to a plane of a surface of the plate light guide 122. For example, the plate light guide 122 may be oriented in a horizontal plane having the top surface and the bottom surface parallel to an x-y plane (e.g., as illustrated). The guided light beam 104 may be collimated or substantially collimated in a vertical plane (e.g., an x-z plane), for example. In some embodiments, the guided light beam 104 may also be collimated or substantially collimated in a horizontal direction (e.g., in the x-y plane).

Herein, a 'collimated' light beam is defined as a beam of light in which rays of the light beam are substantially parallel to one another within the light beam (e.g., the guided light beam 104). Further, rays of light that diverge or are scattered from the collimated light beam are not considered to be part of the collimated light beam, by definition herein. Collimation of the light to produce the collimated guided light beam 104 may be provided by the lens or mirror (e.g., tilted collimating reflector, etc.) used to couple the light into the plate light guide 122, according to various embodiments.

In some embodiments, the plate light guide 122 is a slab or plate optical waveguide comprising an extended, substantially planar sheet of optically transparent, dielectric material. The substantially planar sheet of dielectric material is configured to guide the guided light beam 104 using total internal reflection. According to various examples, the optically transparent material of the plate light guide 122 may comprise any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the plate light guide 122 may further include a cladding layer on at least a portion of a surface (e.g., one or both of the top surface and the bottom surface) of the plate light guide 122 (not illustrated). The cladding layer may be used to further facilitate total internal reflection, according to some examples.

According to various embodiments (e.g., as illustrated in FIGS. 1A-1B), the multibeam diffraction grating 124 may be located at the top surface of the plate light guide 122 (e.g., adjacent to the first surface of the second planar backlight 120). In other examples (not illustrated), the multibeam diffraction grating 124 may be located within the plate light guide 122. In yet other embodiments (not illustrated), the multibeam diffraction grating 124 may be located at or on bottom surface of the plate light guide 122 (e.g., adjacent to the second surface of the second planar backlight 120). In some embodiments, the second planar backlight 120 may comprise a plurality of multibeam diffraction gratings 124, as illustrated in FIGS. 1A-1B. The plurality of multibeam diffraction gratings 124 may be arranged as or represent an array of multibeam diffraction gratings 124, for example.

According to various embodiments, the multibeam diffraction grating 124 comprises a plurality of diffractive features 124a that diffract light (i.e., provide diffraction). The diffraction is responsible for the diffractive coupling of the portion of the guided light beam 104 out of the plate light guide 122 of the second planar backlight 120. For example, the multibeam diffraction grating 124 may include one or both of grooves in a surface of the plate light guide 122 (see e.g., FIGS. 1A, 1B and 3A) and ridges protruding from the plate light guide surface (see e.g., FIG. 3B) that serve as the diffractive features 124a. The grooves and ridges may be arranged parallel or substantially parallel to one another and, at least at some point, perpendicular to a propagation direction of the guided light beam 104 that is to be coupled out by the multibeam diffraction grating 124.

Figure 3A:
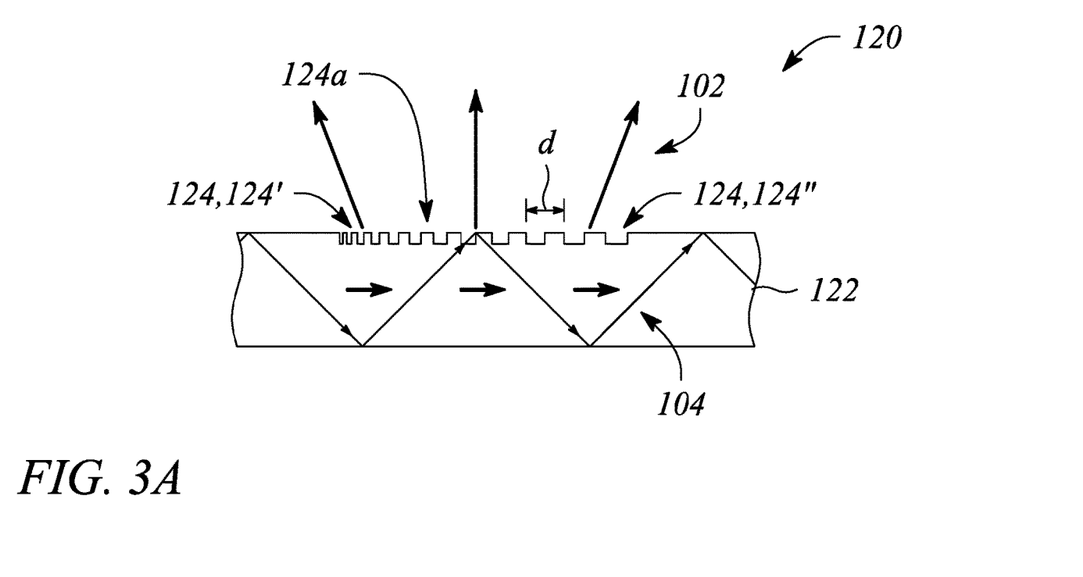
FIG. 3A illustrates a cross sectional view of a portion of a second planar backlight with a multibeam diffraction grating in an example, according to an embodiment consistent with the principles described herein.
Figure 3B:
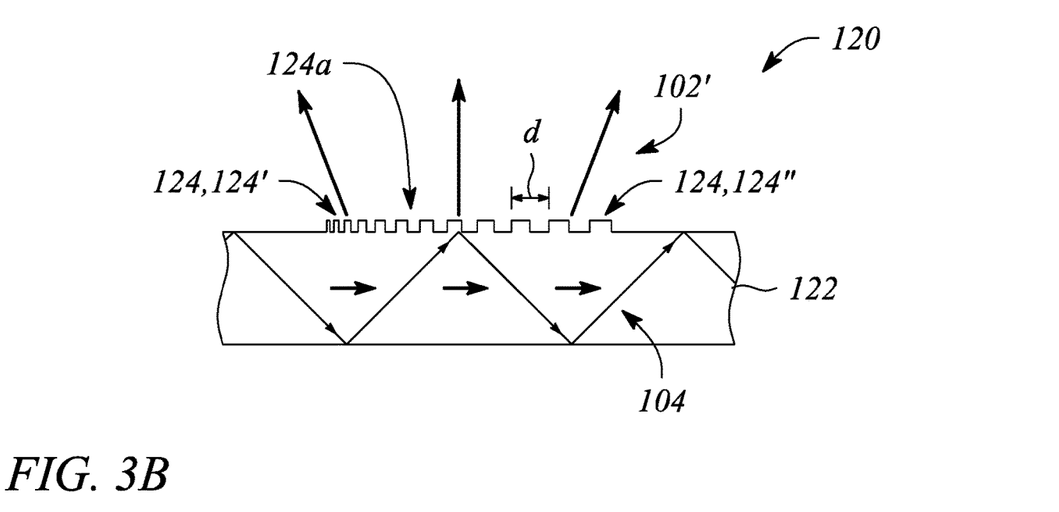
FIG. 3B illustrates a cross sectional view of a portion of a second planar backlight with a multibeam diffraction grating in an example, according to another embodiment consistent with the principles described herein.

In some examples, the diffractive features 124a may be etched, milled or molded into the surface or applied on the surface of the plate light guide 122. As such, a material of the multibeam diffraction grating 124 may include a material of the plate light guide 122. As illustrated in FIGS. 1A-1B and 3A, for example, the multibeam diffraction grating 124 comprises substantially parallel grooves formed in the surface of the plate light guide 122. In FIG. 3B, the multibeam diffraction grating 124 comprises substantially parallel ridges that protrude from the plate light guide surface, for example. In other examples (not illustrated), the multibeam diffraction grating 124 may be implemented in or as a film or layer applied or affixed to the surface of the plate light guide 122.

When the multibeam diffraction grating 124 is a member of a plurality of multibeam diffraction gratings 124, the plurality may be arranged in a variety of configurations with respect to the plate light guide 122. For example, the plurality of multibeam diffraction gratings 124 may be arranged in columns and rows across the plate light guide surface (e.g., as an array). In another example, the plurality of multibeam diffraction gratings 124 may be arranged in groups and the groups may be arranged in rows and columns. In yet another example, the plurality of multibeam diffraction gratings 124 may be distributed substantially randomly across the surface of the plate light guide 122.

According to various examples, the multibeam diffraction grating 124 may comprise a chirped diffraction grating. By definition, the chirped' diffraction grating is a diffraction grating exhibiting or having a diffraction spacing of the diffractive features 124a that varies across an extent or length of the chirped diffraction grating. Further herein, the varying diffraction spacing is defined as a 'chirp'. As a result, the coupled-out light beams exit or are emitted from the multibeam diffraction grating 124 comprising the chirped diffraction grating as the light beams 102 at different diffraction angles corresponding to different points of origin across the chirped diffraction grating. By virtue of a predefined chirp, the chirped diffraction grating of the multibeam diffraction grating 124 is responsible for respective predetermined and different principal angular directions of the coupled-out light beams 102 of the light beam plurality.

Figure 3C:
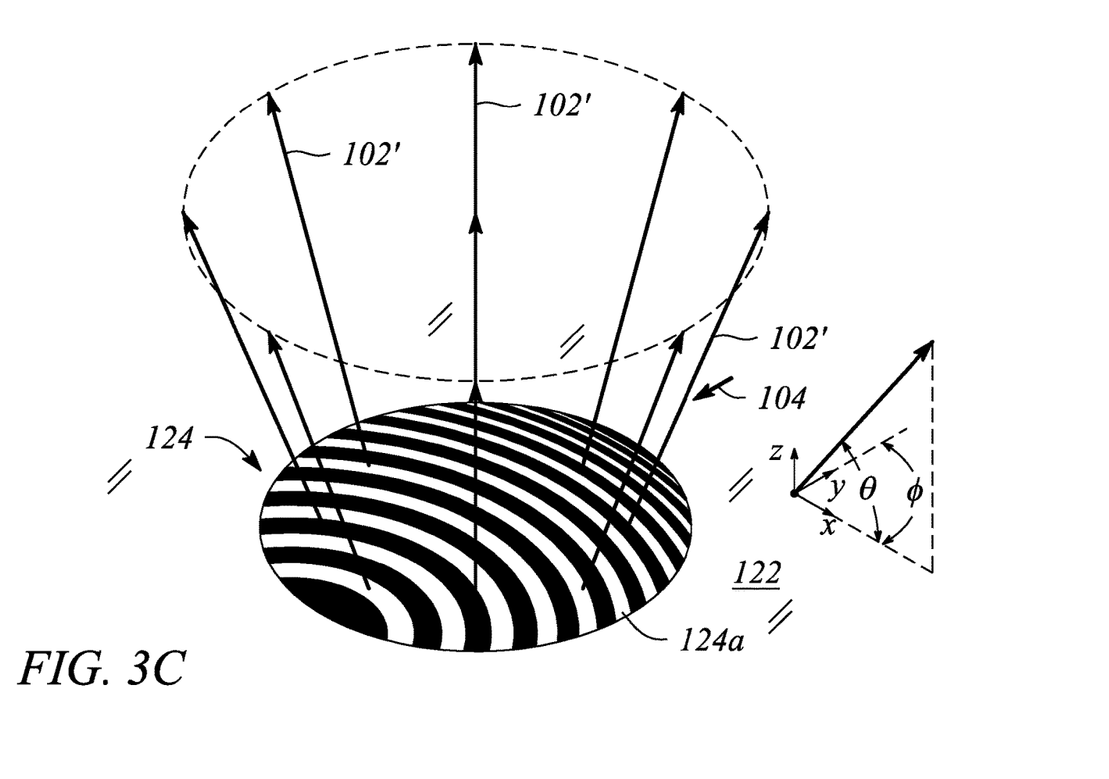
FIG. 3C illustrates a perspective view of the second planar backlight portion of either FIG. 3A or FIG. 3B including the multibeam diffraction grating in an example, according to an embodiment consistent with the principles described herein.

FIG. 3A illustrates a cross sectional view of a portion of the second planar backlight 120 with a multibeam diffraction grating 124 in an example, according to an embodiment consistent with the principles described herein. FIG. 3B illustrates a cross sectional view of a portion of the second planar backlight 120 with a multibeam diffraction grating 124 in an example, according to another embodiment consistent with the principles described herein. FIG. 3C illustrates a perspective view of the second planar backlight portion of either FIG. 3A or FIG. 3B including the multibeam diffraction grating 124 in an example, according to an embodiment consistent with the principles described herein. The multibeam diffraction grating 124 illustrated in FIG. 3A comprises grooves in a surface of the plate light guide 122, by way of example and not limitation. For example, the illustrated multibeam diffraction grating 124 in FIG. 3A may represent one of the groove-based multibeam diffraction gratings 124 illustrated in FIGS. 1A-1B. FIG. 3B illustrates the multibeam diffraction grating 124 comprising ridges protruding from the plate light guide surface.

As illustrated in FIGS. 3A-3B (and also FIGS. 1A-1B by way of example and not limitation), the multibeam diffraction grating 124 is a chirped diffraction grating. In particular, as illustrated, the diffractive features 124a are closer together at a first end 124' of the multibeam diffraction grating 124 than at a second end 124". Further, the diffractive spacing d of the illustrated diffractive features 124a varies from the first end 124' to the second end 124". In some examples, the chirped diffraction grating of the multibeam diffraction grating 124 may have or exhibit a chirp of the diffractive spacing d that varies linearly with distance. As such, the chirped diffraction grating of the multibeam diffraction grating 124 may be referred to as a 'linearly chirped' diffraction grating.

In another example (not illustrated), the chirped diffraction grating of the multibeam diffraction grating 124 may exhibit a non-linear chirp of the diffractive spacing d. Various non-linear chirps that may be used to realize the chirped diffraction grating include, but are not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be used in the multibeam diffraction grating 124.

As illustrated in FIG. 3C, the multibeam diffraction grating 124 includes diffractive features 124a (e.g., grooves or ridges) in, at or on a surface of the plate light guide 122 that are both chirped and curved (i.e., the multibeam diffraction grating 124 is a curved, chirped diffraction grating, as illustrated). The guided light beam 104 has an incident direction relative to the multibeam diffraction grating 124 and the plate light guide 122, as illustrated by a bold arrow in FIGS. 3A-3B. Also illustrated is the plurality of coupled-out or emitted light beams 102 pointing away from the multibeam diffraction grating 124 at the surface of the plate light guide 122. The illustrated light beams 102 are emitted in a plurality of different predetermined principal angular directions. In particular, the different predetermined principal angular directions of the emitted light beams 102 are different in both azimuth and elevation (e.g., to form a light field), as illustrated. According to various examples, both the predefined chirp of the diffractive features 124a and the curve of the diffractive features 124a may be responsible for a respective plurality of different predetermined principal angular directions of the emitted light beams 102.

For example, due to the diffractive feature curve, the diffractive features 124a within the multibeam diffraction grating 124 may have varying orientations relative to an incident direction of the guided light beam 104 guided in the plate light guide 122. In particular, an orientation of the diffractive features 124a at a first point or location within the multibeam diffraction grating 124 may differ from an orientation of the diffractive features 124a at another point or location relative to the guided light beam incident direction. With respect to the coupled-out or emitted light beam 102, an azimuthal component of the principal angular direction $\{\theta, \phi\}$ of the light beam 102 may be determined by or correspond to the azimuthal orientation angle $\phi_f$ of the diffractive features 124a at a point of origin of the light beam 102 (i.e., at a point where the incident guided light beam 104 is coupled out), according to some examples. As such, the varying orientations of the diffractive features 124a within the multibeam diffraction grating 124 produce different light beams 102 having different principal angular directions $\{\theta, \phi\}$, at least in terms of their respective azimuthal components $\phi$.

In particular, at different points along the curve of the diffractive features 124a, an 'underlying diffraction grating' of the multibeam diffraction grating 124 associated with the curved diffractive features 124a has different azimuthal orientation angles $\phi_f$. By 'underlying diffraction grating', it is meant that diffraction gratings of a plurality of non-curved diffraction gratings in superposition yield the curved diffractive features 124a of the multibeam diffraction grating 124. Thus, at a given point along the curved diffractive features 124a, the curve has a particular azimuthal orientation angle $\phi_f$ that generally differs from the azimuthal orientation angle $\phi_f$ at another point along the curved diffractive features 124a. Further, the particular azimuthal orientation angle $\phi_f$ results in a corresponding azimuthal component of a principal angular direction $\{\theta, \phi\}$ of a light beam 102 emitted from the given point. In some examples, the curve of the diffractive features 124a (e.g., grooves, ridges, etc.) may represent a section of a circle. The circle may be coplanar with the light guide surface. In other examples, the curve may represent a section of an ellipse or another curved shape, e.g., that is coplanar with the plate light guide surface.

In other examples, the multibeam diffraction grating 124 may include diffractive features 124a that are 'piecewise' curved. In particular, while the diffractive feature 124a may not describe a substantially smooth or continuous curve per se, at different points along the diffractive feature 124a within the multibeam diffraction grating 124, the diffractive feature 124a still may be oriented at different angles with respect to the incident direction of the guided light beam 104. For example, the diffractive feature 124a may be a groove including a plurality of substantially straight segments, each segment having a different orientation than an adjacent segment. Together, the different angles of the segments may approximate a curve (e.g., a segment of a circle), according to various embodiments. In yet other examples, the diffractive features 124a may merely have different orientations relative to the incident direction of the guided light at different locations within the multibeam diffraction grating 124 without approximating a particular curve (e.g., a circle or an ellipse).

Referring again to FIGS. 1A-1B, the second planar backlight 120 of the dual layer backlight 100 further comprises a light source 126, according to some embodiments. The light source 126 may be coupled to an input end of the plate light guide 122 of the second planar backlight 120, for example. In various embodiments, the light source 126 may comprise substantially any source of light including, but not limited to, a light-emitting diode (LED) and a laser. In some embodiments, the light source 126 may produce a substantially monochromatic light having a narrowband spectrum denoted by a particular color. In particular, the color may be or represent a primary color (e.g., of an electronic display). For example, the light source 126 may produce a plurality of different colors of light representing a plurality of different primary colors. The primary colors may comprise red light, green light and blue light, for example. Further, the primary colors may be primary colors of a color electronic display, wherein the primary colors are selected according to a color model such as, but not limited to, a red-green-blue (RGB) color model configured to support a color gamut of the color electronic display. Moreover, the dual layer backlight 100 comprising the light source 126 may be configured into an electronic display to provide light, such as the primary colors of light.

In some embodiments, the light source 126 includes a plurality of optical emitters 126a. The optical emitters 126a are (or more generally the light source 126 is) configured to provide light to the plate light guide 122 as the guided light 104, i.e., as the guided light beam 104. According to embodiments in which the provided light comprises a plurality of different colors of light (e.g., different primary colors), the provided light when coupled into the plate light guide 122, is configured to be guided as a plurality of different color light beams 104. For example, the plurality of optical emitters 126a may be configured to produce the plurality of different primary colors of light. In some embodiments, the different color optical emitters 126a of the optical emitter plurality may be laterally offset from one another (not separately illustrated) at the input end of the plate light guide 122.

According to some embodiments, the guided light beams 104 of different colors are configured to be guided within the plate light guide 122 at different, color-specific, non-zero propagation angles. For example, a red guided light beam 104 may be coupled into and propagate within the plate light guide 122 at a first non-zero propagation angle; a green guided light beam 104 may be coupled into and propagate within the plate light guide 122 at a second non-zero propagation angle; and a blue guided light beam 104 may be coupled into and propagate within the plate light guide 122 at a third non-zero propagation angle. Moreover, the respective first, second and third non-zero propagation angles are different from one another, according to some embodiments.

As illustrated in FIG. 1B by way of illustration and not limitation, the light source 126 may further comprise a tilted, shaped parabolic reflector 126b. The different, color specific, non-zero propagation angles may be provided by respective red, green and blue optical emitters 126a of the optical emitter plurality laterally offset from one another that feed or emit into the tilted, shaped parabolic reflector 126b at the input end of the plate light guide 122, for example. In particular, the lateral offset of the different color optical emitters 126a in conjunction with the titled, shaped parabolic reflector 126b is configured to couple the different light colors (e.g., red light, green light, and blue light) into the plate light guide 122 at corresponding different, color-specific, non-zero propagation angles, according to various embodiments.

According to some embodiments, the light source 126 may be a multicolor light source comprising a plurality of LEDs. LEDs of the plurality may represent different colors of the primary colors of the color electronic display, for example. In particular, the LEDs may comprise a red LED to produce red light, a green LED to produce green light, and a blue LED to produce blue light of the RGB color model, for example. In some embodiments, the light source 126 may comprise a linear array of optical emitters 126a arranged along the input end of the plate light guide 122. Each of the optical emitters 126a may comprise a red LED, a green LED and blue LED, for example. The light source 126 may be configured to produce collimated light (e.g., using a collimating reflector or lens). For example, the tilted, shaped-parabolic reflector 126b illustrated in FIGS. 1A and 1B may be configured to produce a collimated light beam 104 when coupling light from the optical emitters 126a into the plate light guide 122. Substantially any collimator (e.g., collimating lens, collimating reflector, etc.) may be inserted between the light source 126 and the plate light guide 122 to provide a collimated light beam 104 to be guided in the plate light guide 122, according to various embodiments.

According to some embodiments, the dual layer backlight 100 further comprises a light-blocking layer 130 between the first planar backlight 110 and the second planar backlight 120. The light-blocking layer 130 is configured to selectively block light emitted from the second surface (e.g., back surface) of the second planar backlight 120 from entering the first planar backlight 110, according to some embodiments. In particular, the light-blocking layer 130 is configured to block light emitted from the second planar backlight 120 generally toward the first planar backlight 110, i.e., in a 'first direction'. On the other hand, the light-blocking layer 130 is further configured to transmit light emitted from the first planar backlight 110 generally toward the second surface of the second planar backlight 120, i.e., in a 'second direction' opposite to the first direction, in at least some operational modes and according to at least some embodiments of the dual layer backlight 100. As such, the light-blocking layer 130 may represent a unidirectional light-blocking layer 130, according to some embodiments. In other embodiments, the light-blocking layer 130 may be configured to selectively block light from passing through the light-blocking layer 130 and reaching the second planar backlight 120, e.g., from the first planar backlight 110. In these embodiments, the light-blocking layer 130 may block the light only during specific modes of the dual layer backlight 100, for example. The light-blocking layer 130 being configured to block light is illustrated using cross-hatching in FIG. 1B, while absence of the cross-hatching in FIG. 1A illustrates the light-blocking layer 130 being configured to transmit light (e.g., emitted light 102 from the first planar backlight 110).

Figure 4A:
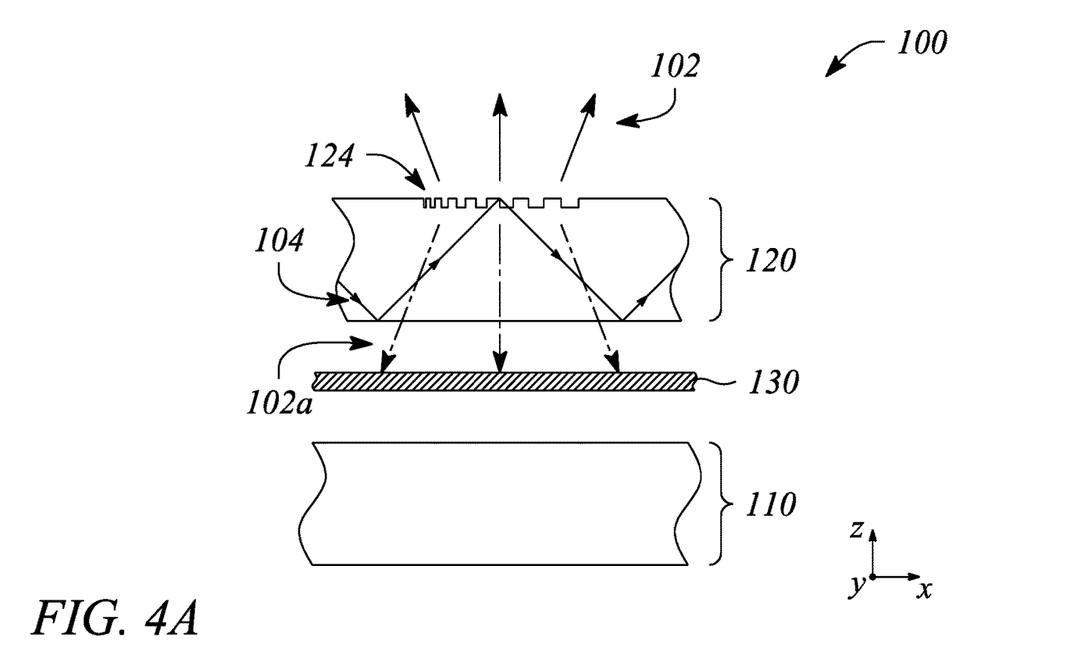
FIG. 4A illustrates a cross sectional view of a portion of a dual layer backlight in an example, according to an embodiment consistent with the principles described herein.
Figure 4B:
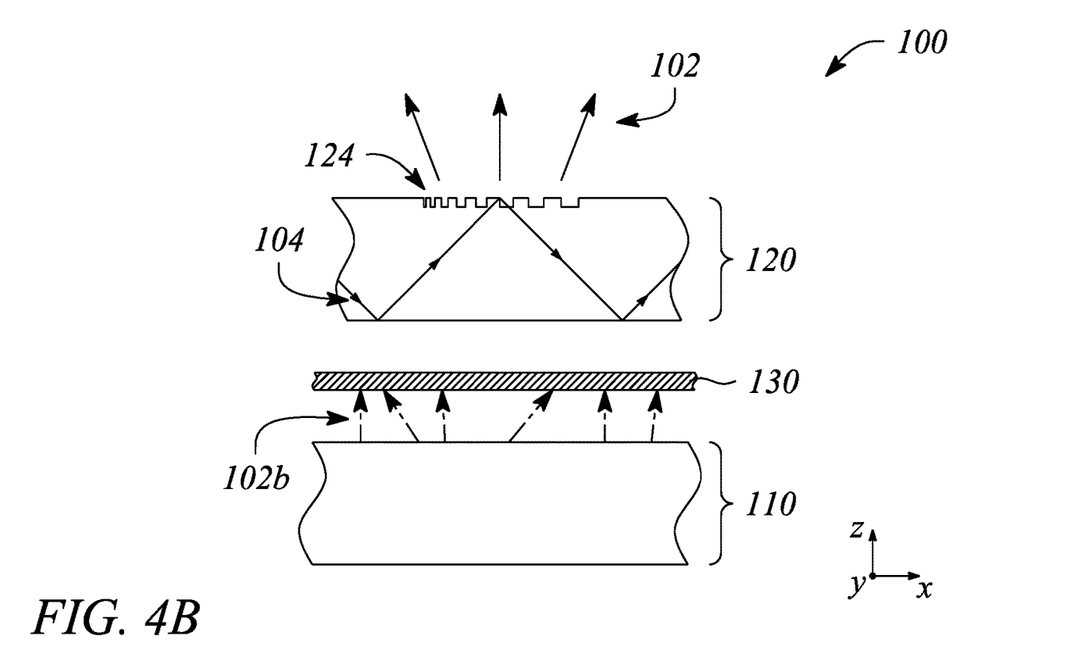
FIG. 4B illustrates a cross sectional view of a portion of a dual layer backlight in another example, according to an embodiment consistent with the principles described herein.

FIG. 4A illustrates a cross sectional view of a portion a dual layer backlight 100 in an example, according to an embodiment consistent with the principles described herein. FIG. 4B illustrates a cross sectional view of a portion of a dual layer backlight 100 in another example, according to an embodiment consistent with the principles described herein. The illustrated portion in FIGS. 4A and 4B may be a portion of the dual layer backlight 100 illustrated in FIG. 1B, for example. In particular, the dual layer backlight 100 illustrated in FIGS. 4A-4B includes the first planar backlight 110, the second planar backlight 120 and the light-blocking layer 130 between the first and second planar backlights 110, 120. As illustrated in FIGS. 4A-4B, the light-blocking layer 130 is configured to block light.

In some embodiments, e.g., as illustrated in FIG. 4A, the light-blocking layer 130 may be configured to block light originating in the second planar backlight 120 and propagating generally in a negative z-direction. For example, a result of diffraction of the guided light beam 104 by the multibeam diffraction grating 124 may be both the coupled-out light beams 102 (e.g., generally directed in a positive z-direction) and a secondary light beam 102a that is scattered or generally directed in the negative z-direction. The light-blocking layer 130 may be configured to block the secondary light beams 102a, as illustrated in FIG. 4A.

Alternatively or in addition (e.g., as illustrated in FIG. 4B), the light-blocking layer 130 may be configured to block light 102b propagating in the positive z-direction from the first planar backlight 110 towards the second planar backlight 120. In particular, the light-blocking layer 130 may be configured to block light 102b propagating in the positive z-direction in a mode in which the second planar backlight 120 is active or otherwise configured to provide the coupled-out light beams 102 (i.e., as illustrated). For example, the positive z-directed light 102b blocked by the light-blocking layer 130 may represent light originating in or produced by the first planar backlight 110. In another example, the positive z-directed light 102b may represent light from the second backlight 120 that is backscattered or reflected by the first planar backlight 110 toward the second planar backlight 120.

According to some embodiments, the light-blocking layer 130 may provide either passive light blocking or an active (e.g., switched) light blocking of the light propagating in the first direction. For example, the light-blocking layer 130 may be a substantially passive layer that blocks light propagating in the first direction while simultaneously transmits light propagating in the second direction. As such, the light-blocking layer 130 may remain substantially unchanged in both the first mode and the second mode of operation of the dual layer backlight 100. Examples of a passive layer that may be employed as the light-blocking layer 130 include, but are not limited to, a so-called unidirectional perfect absorber, a polarizer or polarization layer, and an angular filter. Other examples of a passive layers may include a multi-band filter (e.g., multi-band color filter) configured to selectively block (e.g., reflect, absorb, etc.) particular wavelengths of light produced by the second planar backlight 120 while allowing different wavelengths of light produced by the first planar backlight 110 to pass, for example.

In another example, the light-blocking layer 130 may be an active layer configured to block light transmission in a light-blocking mode or condition and to transmit light in a light-transmitting mode or condition. The active light-blocking layer 130 may be selectively switched into the light-blocking condition when the second planar backlight 120 is active to prevent light from being transmitted from the second planar backlight 120 toward and into the first planar backlight 110. The second planar backlight 120 is active in the second mode of the dual layer backlight 100, described above. Moreover, the active light-blocking layer 130 may be selectively switched into the light-transmitting condition when the first planar backlight 110 is active to allow light to propagate out of and through the second planar backlight 120 as the emitted light 102. The first planar backlight 110 is active when the dual layer backlight 100 is in the first mode, as described above. Examples of active light-blocking layers 130 include, but are not limited to, a light valve (e.g., liquid crystal light valve) or a similar switchable absorption layer. Other examples include various other so-called 'active' shutter configurations based on electromechanical structures (e.g., microelectromechanical or MEMs mirrors, etc.), electroabsorption (e.g., semiconductor-based), and various non-linear crystals and organic polymers.

According to some embodiments of the principles described herein, a two-dimensional/three-dimensional (2D/3D) mode-switchable electronic display is provided. The 2D/3D mode-switchable electronic display is configured to emit modulated light corresponding to or representing 2D pixels of the 2D/3D mode-switchable electronic display in a first mode. Moreover, the 2D/3D mode-switchable electronic display is configured to emit modulated, coupled-out light beams having different directions as or representing 3D pixels corresponding to different 3D views of the 2D/3D mode-switchable electronic display in a second mode. The first mode may also be referred to as a 2D mode, while the second mode may also be referred to as a 3D mode, for example. In the 2D mode, the 2D/3D mode-switchable electronic display is configured to display 2D information (e.g., 2D images, text, etc.). On the other hand, in the 3D mode, the 2D/3D mode-switchable electronic display is configured to display 3D information (e.g., 3D images). In particular, the 2D/3D mode-switchable electronic display may represent an autostereoscopic or glasses-free 3D electronic display in the second or 3D mode. That is, different ones of the modulated, differently directed light beams may correspond to different 'views' associated with the 3D information display, according to various examples. The different views may provide a 'glasses free' (e.g., autostereoscopic, holographic, etc.) representation of information being displayed by the 2D/3D mode-switchable electronic display in the second or 3D mode, for example.

Figure 5:
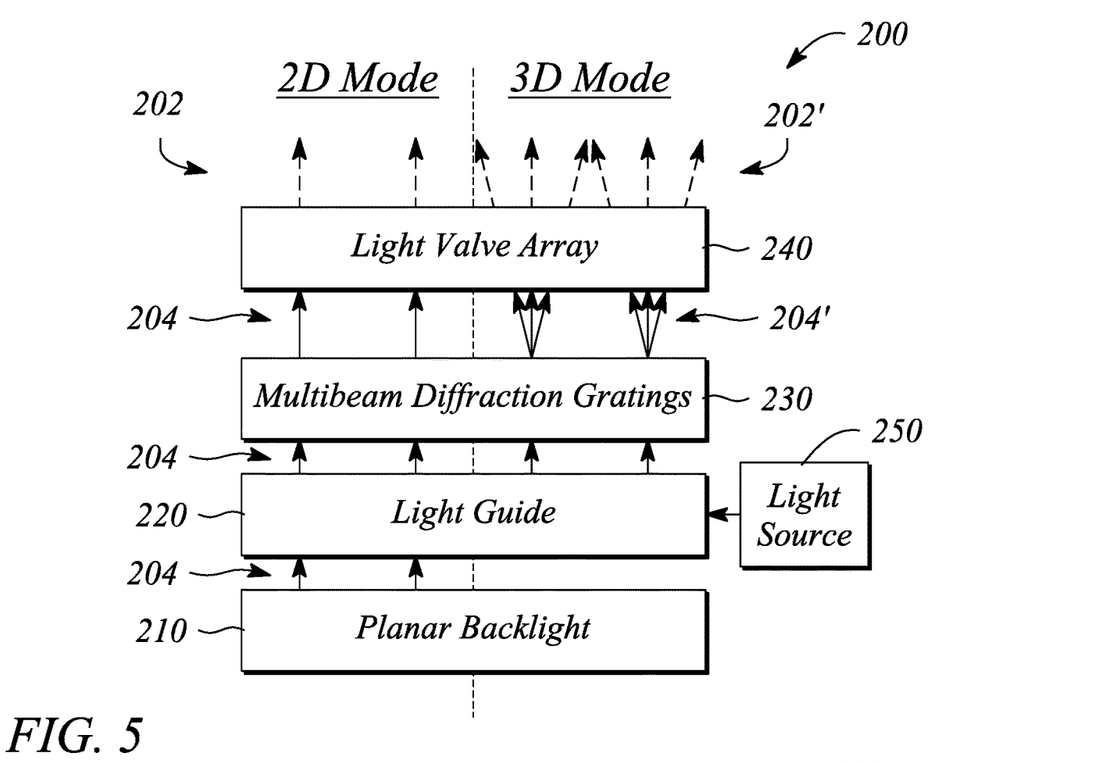
FIG. 5 illustrates a block diagram of a 2D/3D mode-switchable electronic display in an example, according to an embodiment consistent with the principles described herein.

FIG. 5 illustrates a block diagram of a 2D/3D mode-switchable electronic display 200 in an example, according to an embodiment consistent with the principles described herein. The 2D/3D mode-switchable electronic display 200 may be used to present either 2D information or 3D information such as, but not limited to, 2D images, text, and 3D images. In particular, the 2D/3D mode-switchable electronic display 200 illustrated in FIG. 5 is configured to emit modulated light 202 representing 2D pixels. The modulated light 202 representing 2D pixels may be emitted in the 2D mode of operation of the 2D/3D mode-switchable electronic display 200, for example. Further, the 2D/3D mode-switchable electronic display 200 illustrated in FIG. 5 is configured to emit modulated light beams 202' having different principal angular directions representing 3D pixels corresponding to the different views of the 2D/3D mode-switchable electronic display 200 in the 3D mode of operation.

In some embodiments, the modulated light 202 and the modulated light beams 202' may further represent different colors, and the 2D/3D mode-switchable electronic display 200 may be a color electronic display. Note that FIG. 5 illustrates both the modulated light 202 and the modulated light beams 202' being emitted in different regions of the electronic display 200 labeled respectively as '2D mode' and '3D mode,' for ease of illustration. This is to illustrate that the 2D mode and 3D mode may be selectively activated in the electronic display 200 to provide both 2D information and 3D information simultaneously. It should be understood that the 2D/3D mode-switchable electronic display 200 may also be configured to be selectively operated exclusively in either of the first mode or the second mode, according to some embodiments.

The 2D/3D mode-switchable electronic display 200 comprises a planar backlight 210 having a planar light-emitting surface configured to emit light 204. The emitted light 204 is a source of the light that becomes the modulated light 202 emitted by the 2D/3D mode-switchable electronic display 200 in the first mode. According to some embodiments, the planar backlight 210 may be substantially similar to the first planar backlight 110 described above with respect to the dual layer backlight 100. In particular, the light 204 emitted by the planar backlight 210 may be diffuse or substantially diffuse light, in some embodiments. For example, the planar backlight 210 may comprise a diffusion layer or diffuser adjacent to the planar light-emitting surface, the diffuser being configured to scatter the emitted light (i.e., produce substantially diffuse light). In other embodiments, the emitted light 204 may be substantially unidirectional light, according to some embodiments. In some embodiments, the emitted light 204 may be white light, while in other embodiments the emitted light 204 may include a particular color or colors of light (e.g., one or more of red, green and blue light). The emitted light 204 may be provided by a light source (not illustrated) of the planar backlight 210, according to various embodiments. Further, in some embodiments, the planar backlight 210 may comprise a wedge shaped light guide having a light extraction layer configured to extract light from the wedge-shaped light guide and to redirect the extracted light through the diffuser as the emitted light 204.

The 2D/3D mode-switchable electronic display 200 illustrated in FIG. 5 further comprises a light guide 220 configured to guide a light beam. The guided light beam in the light guide 220 is a source of the light that becomes the modulated light beams 202' emitted by the 2D/3D mode-switchable electronic display 200 in the second mode. According to some embodiments, the light guide 220 may be a plate light guide and may be substantially similar to the plate light guide 122 described above with respect to the dual layer backlight 100. For example, the light guide 220 may be a slab optical waveguide comprising a planar sheet of dielectric material configured to guide light by total internal reflection. In some embodiments, the light guide 220 as a plate light guide may be arranged substantially co-planar with the planar backlight 210 (e.g., as illustrated above in FIGS. 1A-1B). Further, for example, a second surface (e.g., back surface) of the light guide 220 may be adjacent to the planar light-emitting surface of the planar backlight 210. A first surface (e.g., top surface) of the light guide 220 opposite to the second surface is a light-emitting surface where the modulated light beams 202' originate (e.g., as coupled-out light beams 204', described below).

According to various embodiments, the light guide 220 is configured to guide the light beam at a non-zero propagation angle within the light guide 220. In some embodiments, the guided light beam may include a plurality of different color guided light beams. Further, the guided light beam in the light guide 220 may be collimated (i.e., the light may be guided as collimated or substantially collimated beam of light), according to some embodiments. As such, the light guide 220 may be configured to guide a collimated light beam at a non-zero propagation angle within the light guide 220.

The 2D/3D mode-switchable electronic display 200 illustrated in FIG. 5 further comprises an array of multibeam diffraction gratings 230. The array of multibeam diffraction gratings 230 may be located in, on or at a surface of the light guide 220, according to various embodiments. For example, the multibeam diffraction gratings 230 of the array may be located at the first or front surface of the light guide 220. According to various embodiments, a multibeam diffraction grating 230 of the array is configured to diffractively couple out a portion of the guided light beam as a plurality of coupled-out light beams 204' having different principal angular directions representing or corresponding to different 3D views of the 2D/3D mode-switchable electronic display 200.

Further, the multibeam diffraction gratings 230 of the array are configured to both diffractively couple out the coupled-out light beams 204' through the first surface of the light guide 220 and to direct the couple-out light beams 204' away from the first surface, e.g., in the different principal angular directions. In some embodiments, the multibeam diffraction grating 230 of the array may be substantially similar to the multibeam diffraction grating 124 of the dual layer backlight 100, described above.

For example, the array of multibeam diffraction gratings 230 may include a chirped diffraction grating. In some embodiments, diffractive features (e.g., grooves, ridges, etc.) of the multibeam diffraction gratings 230 are curved diffractive features. The curved diffractive features may include ridges or grooves that are curved (i.e., continuously curved or piece-wise curved) and spacings between the curved diffractive features that vary as a function of distance across the multibeam diffraction gratings 230 of the array.

As illustrated in FIG. 5, the 2D/3D mode-switchable electronic display 200 further includes a light valve array 240. The light valve array 240 includes a plurality of light valves configured to modulate one or both of the emitted light 204 and the plurality of coupled-out light beams 204'. In particular, the light valves of the light valve array 240 may modulate the emitted light 204 to provide the modulated light 202 that is or represents 2D pixels of the 2D/3D mode-switchable electronic display 200 (e.g., in the first or 2D mode). Similarly, the light valves of the light valve array 240 may modulate the plurality of coupled-out light beams 204' to provide the modulated light beams 202' that are or represent 3D pixels of the 2D/3D mode-switchable electronic display 200 (e.g., in the second or 3D mode). Moreover, different ones of the modulated light beams 202' may correspond to different 3D views of the 2D/3D mode-switchable electronic display 200. In various examples, different types of light valves may be employed in the light valve array 240 including, but not limited to, one or more of liquid crystal (LC) light valves, electrowetting light valves and electrophoretic light valves. Dashed lines are used in FIG. 5 to emphasize modulation of the emitted light 202 and light beams 202', by way of example.

According to some embodiments, the light guide 220 is located between the planar light-emitting surface of the planar backlight 210 and the light valve array 240. In some embodiments, the array of multibeam diffraction gratings 230 is located between the light guide 220 and the light valve array 240 and may be adjacent to the first surface of the light guide 220. Moreover, the light guide 220 and the array of multibeam diffraction gratings 230 may be configured to transmit the light 204 emitted by the planar backlight 210, e.g., from the second surface of the light guide 220 to the first surface thereof. In other words, the light guide 220 and the array of multibeam diffraction gratings 230 may be substantially transparent to the emitted light 204 of the planar backlight 210, according to some embodiments.

Further, as illustrated in FIG. 5, the 2D/3D mode-switchable electronic display 200 may comprise a light source 250, according to some embodiments. The light source 250 is optically coupled to an input end of the light guide 220. In some embodiments, the light source 250 is substantially similar to the light source 126 described above with respect to the dual layer backlight 100. In particular, the light source 250 may comprise a plurality of optical emitters (e.g., LEDs). For example, in some embodiments, the light source 250 may comprise the plurality of optical emitters arranged along the input end of the light guide 220 to provide a corresponding plurality of guided light beams within the light guide 220. The guided light beams of the plurality may be guided in substantially parallel bands at respective non-zero propagation angles across the light guide 220 from the input end to an opposite end thereof. The propagating guided light beams are configured to interact with the multibeam diffraction gratings 230 of the array adjacent to the first surface of the light guide 220. The optical emitters of the light source 250 may be arranged as a linear array, each optical emitter producing a different collimated guided light beam within the light guide 220, for example.

According to some embodiments, the light source 250 may be configured to produce different colors of light (i.e., is a color light source). As such, the 2D/3D mode-switchable electronic display 200 may be a color electronic display, in some embodiments. For example, the optical emitters of the plurality may comprise a first optical emitter configured to emit a first color of light (e.g., red light), a second optical emitter configured to emit a second color of light (e.g., green light), and a third optical emitter configured to emit a third color of light (e.g., blue light). The first optical emitter may be a red light-emitting diode (LED), the second optical emitter may be a green LED, and the third optical emitter may be a blue LED, for example. In other examples, the optical emitter may include each of a red LED, a green LED and a blue LED and thus be a multicolor optical emitter, for example.

In some embodiments in which the light source 250 is a color light source, different color light beams may be guided in the light guide 220 at different, color-specific, non-zero propagation angles. Further, the color-specific, propagation angles may be configured to produce coupled-out, color light beams 204' from the multibeam diffraction gratings 230 that form color-specific light fields configured to provide color pixels corresponding to different 3D views of the 2D/3D mode-switchable electronic display 200. According to various embodiments, the color-specific light fields may have substantially similar cone angles to one another and therefore produce color-specific pixels representing 3D views that are substantially similar to one another, albeit in the different colors.

According to some embodiments (not illustrated in FIG. 5), the 2D/3D mode-switchable electronic display 200 further comprises a light-blocking layer between planar backlight 210 and the light guide 220. In some embodiments, the light-blocking layer may be substantially similar to the light-blocking layer 130 described above with respect to the dual layer backlight 100. In other words, the light-blocking layer may be configured to pass light emitted from the planar backlight 210 and block (e.g., absorb or reflect) any light from the light guide 220 emitted in the direction of the planar backlight 210. Further, the light-blocking layer may be either active or passive, as described above with respect to the light-blocking layer 130. In particular, according to some embodiments, the light-blocking layer may comprise a selectively switchable absorption layer between the planar backlight 210 and the light guide 220.

The switchable absorption layer may be configured to pass emitted light 204 from the planar backlight 210 in the first or 2D mode of the 2D/3D mode-switchable electronic display 200 to allow the emitted light 204 to pass through the light guide 220 and the multibeam diffraction gratings 230 to the light valve array 240 for modulation as the modulated emitted light 202. Further, the switchable absorption layer may be configured to absorb any light emitted from the second surface of the light guide 220 in the second or 3D mode of the 2D/3D mode-switchable electronic display 200. Absorption of light emitted from the second surface in the second mode may prevent light leakage from the light guide 220 from interfering with production of the coupled-out light beams 204' at the first surface of the light guide 220, according to some embodiments. For example, second mode absorption of light by the switchable absorption layer may reduce or prevent the light from reflecting off the planar backlight 210 and re-entering the light guide 220 as a diffuse, background light source.

Figure 6:
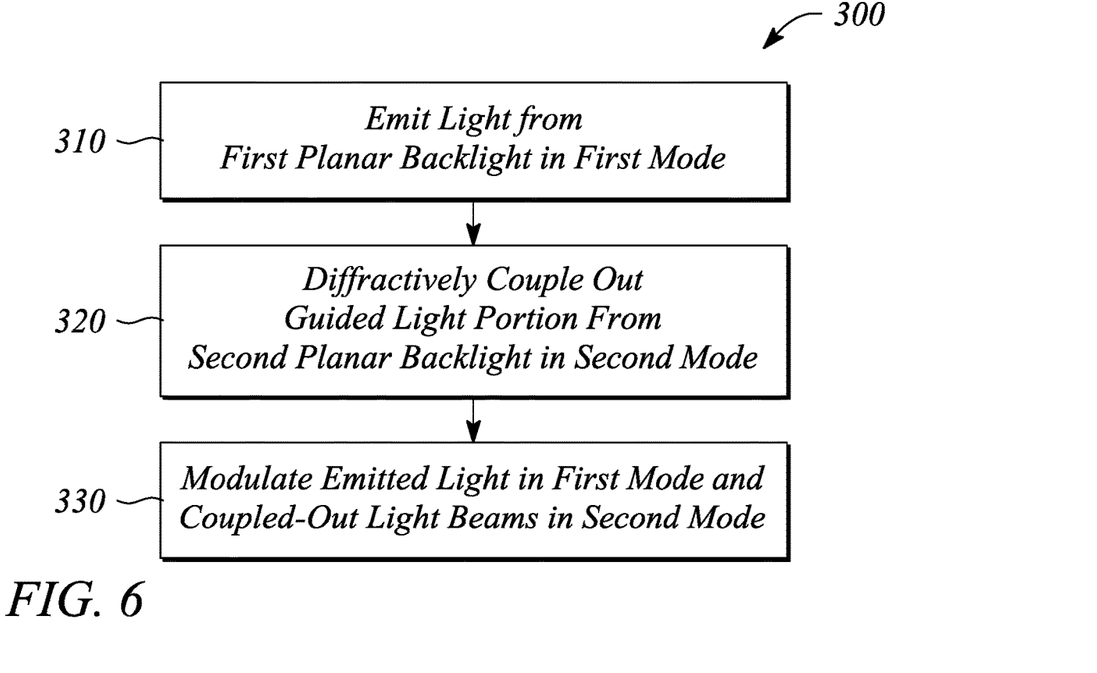
FIG. 6 illustrates a flow chart of a method of backlighting a two-dimensional/three-dimensional (2D/3D) electronic display having 2D/3D switchable modes in an example, according to an embodiment consistent with the principles described herein.

According to some examples of the principles described herein, a method of backlighting a two-dimensional/three-dimensional (2D/3D) electronic display having 2D/3D switchable modes is provided. FIG. 6 illustrates a flow chart of a method 300 of backlighting a 2D/3D electronic display having 2D/3D switchable modes in an example, according to an embodiment consistent with the principles described herein.

As illustrated in FIG. 6, the method 300 of backlighting a 2D/3D electronic display comprises emitting 310 light from a light-emitting surface of a first planar backlight in a first switchable mode. In some embodiments, the first planar backlight is substantially similar to the first planar backlight 110, described above with respect to the dual layer backlight 100. Further, the first switchable mode and the emitted 310 light may be substantially similar to respective ones of the first mode (e.g., 2D mode) and the emitted light 102 described above with respect to the dual layer backlight 100, according to some embodiments.

The method 300 of backlighting a 2D/3D electronic display further comprises diffractively coupling out 320 in a second switchable mode a portion of a light beam guided within a plate light guide of a second planar backlight using a multibeam diffraction grating. Diffractive coupling out 320 is configured to provide a plurality of coupled-out light beams directed away from the second planar backlight in a plurality of principal angular directions corresponding to different 3D views of the 2D/3D electronic display, according to various embodiments. In some embodiments, the second planar backlight is substantially similar to the second planar backlight 120 of the dual layer backlight 100, described above. In particular, the plate light guide, the guided light beam and the multibeam diffraction grating may be substantially similar to respective ones of the plate light guide 122, the guided light beam and the multibeam diffraction grating 124 described above with respect to the dual layer backlight 100. Likewise, the second switchable mode may be substantially similar to the second mode (e.g., 3D mode) of the dual layer backlight 100, according to some embodiments.

For example, the method 300 of backlighting a 2D/3D electronic display may further comprise guiding the guided light beam in the plate light guide of the second planar backlight. Further the light beam may be guided at a non-zero propagation angle and as a collimated light beam, for example. In some embodiments, the guided light beam may comprise a plurality of different color light beams, wherein the different color light beams are guided in the plate light guide at corresponding different, color-specific non-zero propagation angles. Also, according to various embodiments, the second planar backlight is configured to transmit the emitted light from the first planar backlight through the second planar backlight and to re-emit the emitted light in the first switchable mode.

According to various embodiments, the multibeam diffraction grating is located at, in or on the surface of the plate light guide. The multibeam diffraction grating may be formed in the plate light guide surface as grooves, ridges, etc., for example. In other examples, the multibeam diffraction grating may include a film on the plate light guide surface. In other examples, the multibeam diffraction grating is located elsewhere including, but not limited to, within the plate light guide. According to some embodiments, the multibeam diffraction grating comprises a chirped diffraction grating having one of curved grooves and curved ridges that are spaced apart from one another. In some embodiments, the multibeam diffraction grating may be a linearly chirped diffraction grating.

According to various embodiments, the diffractively coupled out 320 portion of the guided light beam may produce a plurality of emitted (or coupled-out) light beams directed away from a surface of the plate light guide (e.g., a surface having the multibeam diffraction grating). Each of the emitted light beams of the light beam plurality is directed away from the surface at a different predetermined principal angular direction. In particular, an emitted light beam of the light beam plurality may have a different principal angular direction from other emitted light beams of the light beam plurality as result of diffractive coupling out 320 by the multibeam diffraction grating. The different principal angular directions of the emitted light beams may correspond to different 3D views of a three-dimensional (3D) electronic display. As such, the 2D/3D electronic display may selectively provide a 3D electronic display in the second switchable mode. On the other hand, the 2D/3D electronic display may selectively provide a 2D electronic display when light emitted 310 from the first planar backlight is transmitted through the second planar backlight in the first switchable mode of the 2D/3D electronic display, for example.

In some embodiments, the method 300 of backlighting a 2D/3D electronic display further comprises modulating 330 the emitted light in the first switchable mode and the plurality of coupled-out light beams in the second switchable mode using a plurality of light valves. In particular, the selectively produced emitted light from the first planar backlight and the selectively produced plurality of coupled-out light beams from the second planar backlight are modulated 330 by passing through or otherwise interacting with the light valves in the first switchable mode or the second switchable mode, respectively. The modulated 330 emitted light may form 2D pixels of the 2D/3D electronic display in the first switchable mode, while the modulated 330 coupled-out light beams may form 3D pixels of the 2D/3D electronic display the second switchable mode. The modulated 330 coupled-out light beams may provide a plurality of 3D views of the 2D/3D electronic display (e.g., as a glasses-free, 3D electronic display), for example.

In some examples, the plurality of light valves used in modulating 320 is substantially similar to a light valve of the light valve array 240 described above with respect to the 2D/3D mode-switchable electronic display 200. For example, the light valves may include liquid crystal light valves. In another example, the light valves may be another type of light valve including, but not limited to, an electrowetting light valve and an electrophoretic light valve. Modulating 330 the light may be applied on a color-specific basis, according to some embodiments (e.g., when color optical emitters are employed, using color filters, etc.).

According to some embodiments, the method 300 of backlighting a 2D/3D electronic display further comprises selectively blocking light from the second planar backlight that may be emitted in a direction of the first planar backlight during the second switchable mode. According to some embodiments, selectively blocking light may employ a light-blocking layer substantially similar to the light-blocking layer 130 described above with respect to the dual layer backlight 100. For example, in some embodiments, selectively blocking light comprises selectively absorbing the light using a switchable or active light-absorbing layer. In some embodiments, the method 300 of backlight a 2D/3D electronic display further comprises operating a first portion of the 2D/3D electronic display in the first switchable mode and another portion of the 2D/3D electronic display in the second switchable mode.

Thus, there have been described examples of a dual layer backlight, a 2D/3D mode-switchable electronic display and a method of backlighting a 2D/3D electronic display having 2D/3D switchable modes. It should be understood that the above-described examples are merely illustrative of some of the many specific examples and embodiments that represent the principles described herein. Clearly, those skilled in the art can readily devise numerous other arrangements without departing from the scope as defined by the following claims.

What is claimed is:

1. A dual layer backlight comprising:
a first planar backlight having a planar light-emitting surface configured to emit light; and
a second planar backlight comprising a plate light guide and an array of multibeam diffraction gratings spaced apart from one another across the plate light guide, each multibeam diffraction grating of the multibeam diffraction grating array comprising a plurality of diffractive features collectively configured to diffractively couple out a portion of a guided light beam within the plate light guide as a plurality of coupled-out light beams directed away from a first surface of the second planar backlight opposite to a second surface of the second planar backlight, the second surface being adjacent to the planar light-emitting surface of the first planar backlight,
wherein each light beam of the coupled-out light beam plurality has a different principal angular direction from other light beams of the coupled-out light beam plurality, and
wherein the plurality of coupled-out light beams having different principal angular directions forms a light field configured to represent three dimensional (3D) pixels corresponding to different 3D views of an electronic display.

2. The dual layer backlight of claim 1, wherein the first planar backlight is configured to provide emitted light that is transmitted through the second planar backlight in a first mode, the second planar backlight being configured to provide the plurality of coupled-out light beams in a second mode.

3. The dual layer backlight of claim 1, wherein the plate light guide of the second planar backlight is configured to guide the guided light beam at a non-zero propagation angle, and wherein the multibeam diffraction grating is located at the first surface of the second planar backlight.

4. The dual layer backlight of claim 1, wherein the guided light beam is configured to be a collimated light beam guided in the plate light guide.

5. The dual layer backlight of claim 1, wherein the multibeam diffraction grating is a linearly chirped diffraction grating.

6. The dual layer backlight of claim 1, further comprising a light source coupled to an input end of the second planar backlight, the light source to provide a plurality of different colors of light to be guided as a plurality of different color guided light beams, wherein different color light beams of the plurality of different color guided light beams are configured to be guided within the plate light guide at different, color-specific, non-zero propagation angles, the plurality of different color guided light beams being collimated by a collimator.

7. The dual layer backlight of claim 1, further comprising a light-blocking layer between the first planar backlight and the second planar backlight, the light-blocking layer being configured to selectively absorb light resulting from diffraction by the array of multibeam diffraction gratings.

8. An electronic display comprising the dual layer backlight of claim 1, the electronic display further comprising a light valve located adjacent to the first surface of the second planar backlight and configured to modulate light from the dual layer backlight, the modulated light corresponding to a pixel of the electronic display.

9. The electronic display of claim 8, wherein the light valve comprises a plurality of liquid crystal light valves.

10. A two-dimensional/three-dimensional (2D/3D) mode-switchable electronic display comprising:
a planar backlight having a planar light-emitting surface configured to emit light;
a light guide adjacent to the planar light-emitting surface of the planar backlight, the light guide being configured to guide a light beam;
an array of multibeam diffraction gratings spaced apart from one another at a surface of the light guide, each multibeam diffraction grating of the multibeam diffraction grating array comprising a plurality of diffractive features collectively configured to diffractively couple out a portion of the guided light beam as a plurality of coupled-out light beams having different principal angular directions representing different 3D views of the 2D/3D mode-switchable electronic display; and
a light valve array configured to selectively modulate the emitted light as 2D pixels in a first mode and the coupled-out light beams as 3D pixels corresponding to the different 3D views in a second mode of the 2D/3D mode-switchable electronic display.

11. The 2D/3D mode-switchable electronic display of claim 10, wherein the light guide is located between the planar light-emitting surface of the planar backlight and the light valve array, the light guide and the multibeam diffraction grating array being configured to transmit the planar backlight emitted light in the first mode.

12. The 2D/3D mode-switchable electronic display of claim 10, wherein the planar backlight comprises a diffuser adjacent to the planar light-emitting surface, the diffuser being configured to scatter the emitted light.

13. The 2D/3D mode-switchable electronic display of claim 12, wherein the planar backlight comprises a wedge-shaped light guide having a light extraction layer configured to extract light from the wedge-shaped light guide and to redirect the extracted light through the diffuser as the emitted light.

14. The 2D/3D mode-switchable electronic display of claim 10, wherein the light guide is configured to guide the guided light beam as a collimated light beam at a non-zero propagation angle.

15. The 2D/3D mode-switchable electronic display of claim 10, wherein the multibeam diffraction grating of the multibeam diffraction grating array is a chirped diffraction grating comprising one of curved grooves and curved ridges that are spaced apart from one another.

16. The 2D/3D mode-switchable electronic display of claim 10, further comprising a light source optically coupled to an input end of the light guide, the light source comprising a plurality of optical emitters arranged along the light guide input end to provide a corresponding plurality of light beams to the light guide to be guided.

17. The 2D/3D mode-switchable electronic display of claim 16, wherein the plurality of optical emitters comprises a first optical emitter configured to emit red light, a second optical emitter configured to emit green light, and a third optical emitter configured to emit blue light, the 2D/3D mode-switchable electronic display being a color 2D/3D mode-switchable electronic display, wherein a parabolic reflector is positioned at the output of the plurality of optical emitters.

18. The 2D/3D mode-switchable electronic display of claim 10, further comprising a switchable absorption layer between the planar backlight and the light guide, the switchable absorption layer being configured to selectively absorb light resulting from diffraction by the array of multibeam diffraction gratings.

19. A method of backlighting a two-dimensional/three-dimensional (2D/3D) electronic display having 2D/3D switchable modes, the method comprising:
emitting light from a light-emitting surface of a first planar backlight in a first switchable mode; and
diffractively coupling out a portion of a light beam guided within a plate light guide of a second planar backlight in a second switchable mode using an array of multibeam diffraction gratings spaced apart from one another across the plate light guide, each multibeam diffraction grating of the multibeam diffraction grating array providing a separate plurality of coupled-out light beams directed away from the second planar backlight in a plurality of principal angular directions corresponding to different 3D views of the 2D/3D electronic display,
wherein the second planar backlight is configured to transmit the emitted light from the first planar backlight through the second planar backlight and to re-emit the emitted light in the first switchable mode, and wherein each multibeam diffraction grating comprises a plurality of diffractive features, and wherein each multibeam diffraction grating of the multibeam diffraction grating array comprises a plurality of diffractive feature that act collectively to provide the diffractive coupling.

20. The method of backlighting a 2D/3D electronic display of claim 19, the method further comprising guiding the light beam in the plate light guide of the second planar backlight at a non-zero propagation angle, the guided light beam being collimated.

21. The method of backlighting a 2D/3D electronic display of claim 20, wherein the guided light beam comprises a plurality of different color light beams, the different color light beams being guided in the plate light guide at corresponding different, color-specific non-zero propagation angles, wherein the guided light beam is collimated by a collimator.

22. The method of backlighting a 2D/3D electronic display of claim 19, wherein the multibeam diffraction grating is a linearly chirped diffraction grating comprising one of curved grooves and curved ridges that are spaced apart from one another.

23. The method of backlighting a 2D/3D electronic display of claim 19, the method further comprising modulating with a light valve the emitted light in the first switchable mode and the plurality of coupled-out light beams in the second switchable mode, modulated emitted light forming 2D pixels of the 2D/3D electronic display and modulated coupled-out light beams forming 3D pixels of the 2D/3D electronic display.

24. The method of backlighting a 2D/3D electronic display of claim 19, further comprising selectively absorbing, by a light blocking layer, light resulting from diffraction by the array of multibeam diffraction gratings, the light blocking layer positioned between the first planar backlight and the second planar backlight.

25. The method of backlighting a 2D/3D electronic display of claim 19, further comprising operating a first portion of the 2D/3D electronic display in the first switchable mode and another portion of the 2D/3D electronic display in the second switchable mode.

* * * * *